United States Patent
Dillabough et al.

(10) Patent No.: US 6,584,521 B1
(45) Date of Patent: Jun. 24, 2003

(54) SCALEABLE BANDWIDTH INTERCONNECT FOR SIMULTANEOUS TRANSFER OF MIXED PLEISIOCHRONOUS DIGITAL HIERARCHY (PDH) CLIENTS

(75) Inventors: Jeff D. Dillabough, Surrey (CA); Steve Lang, Vancouver (CA); Winston Mok, Vancouver (CA)

(73) Assignee: PMC-Sierra, Inc. (CA)

( * ) Notice: Subject to any disclaimer, the term of this patent is extended or adjusted under 35 U.S.C. 154(b) by 0 days.

(21) Appl. No.: 09/472,153

(22) Filed: Dec. 27, 1999

(51) Int. Cl.[7] .............................................. G06F 13/00
(52) U.S. Cl. ........................ 710/100; 710/305; 709/249
(58) Field of Search .................................. 710/100, 105, 710/5, 106, 31–33, 107, 62, 63, 305, 311, 29; 709/213, 231, 201, 227, 238, 249; 370/498, 252, 254, 464, 912

(56) References Cited

U.S. PATENT DOCUMENTS

| | | | |
|---|---|---|---|
| 6,101,567 A | * | 8/2000 | Kim et al. |
| 6,247,083 B1 | * | 6/2001 | Hake et al. |
| 6,366,630 B1 | * | 4/2002 | Okuyama |

OTHER PUBLICATIONS

COMBUS—A Backplane Bus and Package for SONET Applications, IEEE P1396.A/D6.0 (First Draft), Nov. 30, 1990.

American National Standard for Telecommunications—Synchronous Optical Network (SONET)—Payload Mappings, ANSI T1.105.02–1995.

GO–MVIP, H–MVIP standard, Release 1.1a, 1997.

American National Standard for Telecommunications—Synchronous Optical Network (SONET)—Basic Description Including Multiplex Structure, Rates, and Formats, ANSI T1.105–1995.

ITU–T, Series G: Transmission Systems and Media, Network Node Interface for the Synchronous Digital Hierarchy (SDH), G.707, Mar., 1996.

* cited by examiner

Primary Examiner—Gopal C. Ray
(74) Attorney, Agent, or Firm—Hall, Priddy, Myers & Vande Sande

(57) ABSTRACT

A scaleable bandwidth interconnect (SBI) for interconnection of physical layer devices with link layer devices which includes an ADD BUS interface operative to receive data from one of the link layer devices and direct it to one of the physical layer devices and a DROP BUS interface operative to receive data from one of the physical layer devices and direct it to one of the link layer devices. By utilizing buses to access each of the physical layer devices and the link layer devices permits interfacing between a high density of physical layer devices and a high density of link layer devices.

21 Claims, 7 Drawing Sheets

SCALEABLE BANDWIDTH INTERCONNECT FOR SIMULTANEOUS TRANSFER OF MIXED PLEISIOCHRONOUS DIGITAL HIERARCHY (PDH) CLIENTS

FIELD

The present invention relates to a scalable bandwidth interconnect bus that provides a multipoint-to-multipoint interconnection between communications devices supporting a large number of individual links for use as a high channel density interconnect with optional cross connect capability. The scalable bandwidth interconnect bus supports a synchronous mode of operation as well as an asynchronous mode of operation employing flexible timing mastership.

BACKGROUND

Typically, an optical fiber, twisted pair electrical or coaxial cable is used for an electrical transmission facility. Such a facility is coupled to a physical medium dependent sub layer (PMD sub layer) which is the lowest sub layer of the two sub layers of the physical layer. The physical layer is the lowest level layer function of the layer functions in the Broadband Integrated Services Digital Network model. The physical layer is responsible for typical physical layer functions, such as bit transfer/reception and bit synchronization. There is a need for interface devices that interconnect physical layer devices including channelized framers with link layer devices of widely varying channel densities and payload types.

SUMMARY OF THE INVENTION

According to the invention there is provided a scalable bandwidth interconnect (SBI) for interconnection of physical layer devices with link layer devices which includes an ADD BUS interface operative to receive data from one or more link layer devices and direct it to one or more physical layer devices and a DROP BUS interface operative to receive data from one or more physical layer devices and direct it to one or more link layer devices. The utilization of buses to access each of the physical layer devices and the link layer devices permits interfacing between a large number of physical layer devices and a large number of link layer devices. Each physical layer device or link layer device may itself handle many links.

The data structures of the SBI may be floating to permit compensation between clock differences on the physical layer devices, the SBI and the link layer devices.

On a per link basis the timing of the link recovered by the physical layer device may be transferred to the DROP BUS interface. On a per link basis the timing on the ADD BUS interface may be transferred from one of the link layer devices or one of the physical layer devices.

Data structures of the SBI may be operative to transfer ABCD signaling bits, alarm indications, 8 kHz timing, and/or per link clock reconstruction information across said SBI.

Links in the form of T1, E1, DS3, and E3 signals may be multiplexed onto and demultiplexed from the SBI bus.

The SBI bus provides an association or mapping function for links between large numbers of physical layer links and link layer links.

The interconnect may have a time division multiplexed bus which has a SONET/SDH virtual tributary structure to carry T1 links, E1 links and Transparent Virtual Tributaries (TVTs).

The location of T1/E1/DS3/E3/TVT1.5/TVT2 channels may be adjusted using floating tributaries to compensate for frequency deviations.

Each frame may have three synchronous payload envelopes with each envelope carrying one of T1, E1, TVT1.5, TVT2, DS3 and E3 tributaries in an SDH STM-1 like format.

The SBI may have payload indicator signals to control position and timing of the floating data structures. The timing information may be obtained by one of the physical layer devices from an arrival rate of data across said SBI when one of the link layer devices is timing master.

A justification request signal may be sent by one of the PHY devices which is timing master to one of the link layer devices to signal the link layer device to speed up or slow down.

The link layer devices may have high density physical layer framers.

The SBI may be scaleable by increasing the bus clock rate in multiples of 2 or, alternatively, by increasing the bus width in multiples of two.

BRIEF DESCRIPTION OF THE DRAWINGS

Further features and advantages will be apparent from the following detailed description, given by way of example, of a preferred embodiment taken in conjunction with the accompanying drawings, wherein.

DETAILED DESCRIPTION WITH REFERENCE TO THE DRAWINGS

This specification describes a 19.44 MHz bus supporting multipoint-to-multipoint operation employing a scalable bandwidth interconnect (SBI). Two modes of operation are mentioned but only an 8-bit 19.44 MHz bus is completely described.

Figure 1:
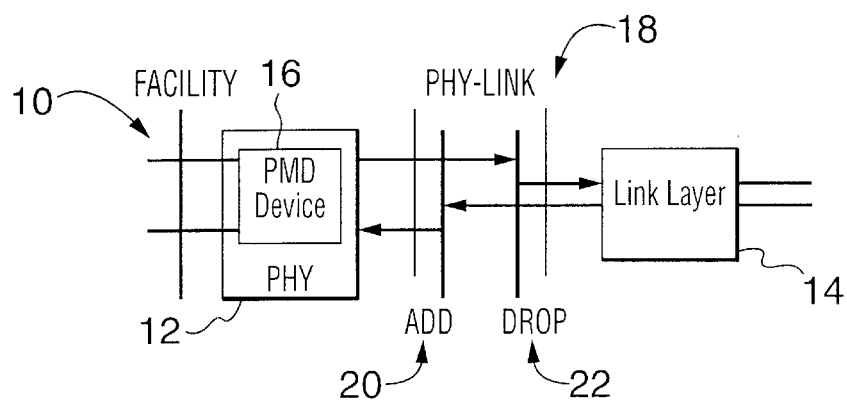
FIG. 1 is a schematic diagram of the scalable bandwidth interconnect shown interconnecting a facility layer with a link layer.

FIG. 1 discloses the general architecture for connecting a facility 10 to a physical layer device 12 to a link layer device 14. An electrical transmission facility is coupled to a physical medium dependent layer (PMD) device 16 and the latter is coupled through a PHY-link interface 18 (i.e. the SBI) to the link layer device 14. There is a facility interface on the physical medium dependent layer device 16 that may be SONET/SDH T1, E1, DS3 or E3. These multiplexing and signaling hierarchies are specified by several national and international standards organizations. The link layer device 14 is coupled to the PMD layer device 16 through the SBI 18 which consists of an ADD BUS interface 20 which interfaces data flowing from the link layer device 14 to the PMD layer device 16 and a DROP BUS interface 22 which interfaces data flowing from the PMD layer device 16 to the link layer device 14.

1.1 Conventions

All signals are active high unless denoted by a trailing "B".

| | |
|---|---|
| SIGNAL | Active High |
| SIGNALB | Active Low |

The term "Link" refers to a link that is multiplexed onto the SBI bus. This is either a T1, E1, DS3, or E3 signal, which is being multiplexed or demultiplexed from the SBI bus. When a Link is multiplexed within the SBI then it is referred to as a tributary.

The term "TVT" refers to Transparent Virtual Tributaries. A TVT1.5 is either a SONET VT1.5 Virtual Tributary or a SDH TU11 Tributary Unit which is being multiplexed or demultiplexed from the SBI bus. A TVT2 is either a SONET VT2 Virtual Tributary or a SDH TU12 Tributary Unit which is being multiplexed or demultiplexed from the SBI bus.

1.2 Bus Widths

The scalable bandwidth interconnect supports an 8-bit data bus width. A single parity bit is used for the 8-bit data bus. Parity is programmable to be either odd or even. All devices capable of sourcing data onto this bus are to use tristate outputs. Pull-up resistors should not be included in any SBI compliant device but if they are included they must have a disable capability.

1.3 Clock Rates

The bus operates at a 19.44 MHz±50 ppm clock rate. This clock is common to all devices connecting to a scalable bandwidth interconnect.

1.4 Bus Loading

Multiple physical layer devices (PHYs) and multiple link layer devices share the scalable bandwidth interconnect. The maximum number of devices sharing a bus or signal is limited only by the need to meet the AC timing requirements of the bus. All SBI compatible devices must drive a minimum of eight loads without any form of active termination. A load is defined as either an input, output or bidirectional pin and is independent of whether the load is from a PHY device 12 or a link layer device 14.

Schmidt triggers are recommended on all SBI inputs.

1.5 Signal Levels

The scalable bandwidth interconnect uses 3.3V TTL signal levels and is not 5V tolerant.

1.6 Timing Masters

The scalable bandwidth interconnect is a synchronous bus which is timed to a reference 19.44 MHz clock and a 2 KHz frame pulse (8 KHz is easily derived from the 2 KHz and 19.44 MHz clock). All sources and sinks of data on this bus are timed to the reference clock and frame pulse.

The data format on the data bus allows for compensating between clock differences on the PHY, SBI and link layer devices. This is achieved by floating data structures within the SBI format (see Section 2).

Timing is communicated across the scalable bandwidth interconnect by floating data structures within the SBI. Payload indicator signals in the SBI control the position of the floating data structure and therefore the timing. When sources are running faster than the SBI, the floating payload structure is advanced by an octet by passing an extra octet in the V3 octet locations (H3 octet or DS3 and E3 mappings) (see section 2 for a detailed specification of channel mappings). When the source is slower than the SBI the floating payload is retarded by leaving the octet after the V3 or H3 octet unused. Both these rate adjustments are indicated by the SBI control signals.

On the DROP BUS 22 all timing is sourced from the PHY 12 and is passed onto the link layer device 14 by the arrival rate of data over the SBI.

On the ADD BUS 20 either the PHY 12 or the link layer device 14 can control timing by controlling the payload and by making justification requests. When the link layer device 14 is the timing master the PHY device 12 gets its transmit timing information from the arrival rate of data across the SBI. When the PHY device 12 is the timing master it signals the link layer device 14 to speed up or slow down with justification request signals. The PHY timing master indicates a speedup request to the link layer 14 by asserting the justification request signal high during the V3 or H3 octet. When this is detected by the link layer 14 it will advance the channel by inserting data in the next V3 or H3 octet as described above. The PHY timing master indicates a slow-down request to the link layer 14 by asserting the justification request signal high during the octet after the V3 or H3 octet. When detected by the link layer 14, it will retard the channel by leaving the octet following the next V3 or H3 octet unused. Both advance and retard rate adjustments take place in the frame or multi-frame following the justification request.

1.7 Jitter

The Scalable Bandwidth Interconnect bus 18 is a time division multiplexed bus and, as such, introduces jitter into the transported signal. Although ideal for data communication applications, it may be suitable for some jitter sensitive applications only with additional jitter attenuation circuitry.

A method for carrying link rate information across the SBI is outlined below. This is optional on a per channel basis. Two methods are specified, one for T1 and E1 links and the second for DS3 and E3 links. Link rate information is not necessary for TVTs as they are always synchronous to the SBI. These methods use the reference 19.44 MHz SBI clock and the C1FP frame synchronization signal to measure channel clock ticks and clock phase for transport across the bus.

Figure 2:
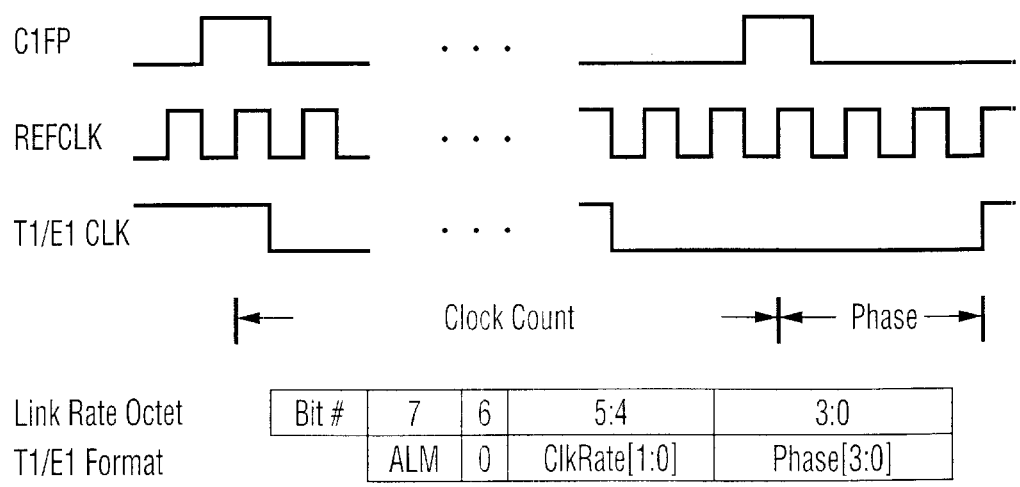
FIG. 2 is a diagram of the link rate information passed across the SBI bus via the V4 octet.

The T1 and E1 method allows for a count of the number of T1 or E1 rising clock edges between two C1FP frame pulses. This count is encoded in ClkRate[1:0] to indicate that the nominal number of clocks, one more than nominal or one fewer than nominal should be generated during the following C1FP period. This method also counts the number of 19.44 MHz clock rising edges after sampling C1FP low to the next rising edge of the T1 or E1 clock, giving the ability to control the phase of the generated clock. The link rate information is passed across the SBI bus via the V4 octet and is shown in FIG. 2.

Table 1 shows the encoding of the clock count, ClkRate [1:0], passed in the link rate octet.

TABLE 1

T1/E1 Clock Rate Encoding

| ClkRate[1:0] | T1 Clocks/2 KHz | E1 Clocks/2 KHZ |
| --- | --- | --- |
| "00"-Nominal | 772 | 1024 |
| "01"-Fast | 773 | 1025 |
| "1x"-Slow | 771 | 1023 |

The DS3 and E3 method or transferring link rate information across the SBI passes the encoded count of DS3/E3 clocks between C1FP pulses in the same method used for T1/E1 tributaries, but does not pass any phase information. The other difference from T1/E1 link rate is that ClkRate [1:0] indicates whether the nominal number of clocks are generated or if four fewer or four extra clocks are generated during the C1FP period. The format of the DS3/E3 link rate octet is shown in Table 2. This is passed across the SBI via the Linkrate octet which follows the H3 octet in the column, see Table 12 and Table 15. Table 3 shows the encoding of the clock count, ClkRate[1:0], passed in the link rate octet.

TABLE 2

DS3/E3 Link Rate Information

| Link Rate Octet | Bit # | 7 | 6 | 5:4 | 3:0 |
| --- | --- | --- | --- | --- | --- |
| DS3/E3 Format | | ALM | 0 | ClkRate[1:0] | Unused |

TABLE 3

DS3/E3 Clock Rate Encoding

| ClkRate[1:0] | DS3 Clocks/2 KHz | E3 Clocks/2 KHZ |
| --- | --- | --- |
| "00"-Nominal | 22368 | 17184 |
| "01"-Fast | 22372 | 17188 |
| "1x"-Slow | 22364 | 17180 |

1.8 Alarms

The present specification provides a method for transferring alarm conditions across the SBI bus. This is optional on a per tributary basis and is valid for T1, E1, DS3, E3 tributaries but not valid for transparent VTs.

FIG. 2 and Table 2 show the alarm indication bit, ALM, as bit 7 of the link rate Octet. Devices that do not support alarm indications should set this bit to 0. When not enabled the receiving device must ignore the value of this bit.

The ALM bit set high in the link rate octet indicates the presence of an alarm condition. The ALM bit set low in the link rate octet indicates the absence of an alarm condition.

1.9 Interface Example

Figure 3:
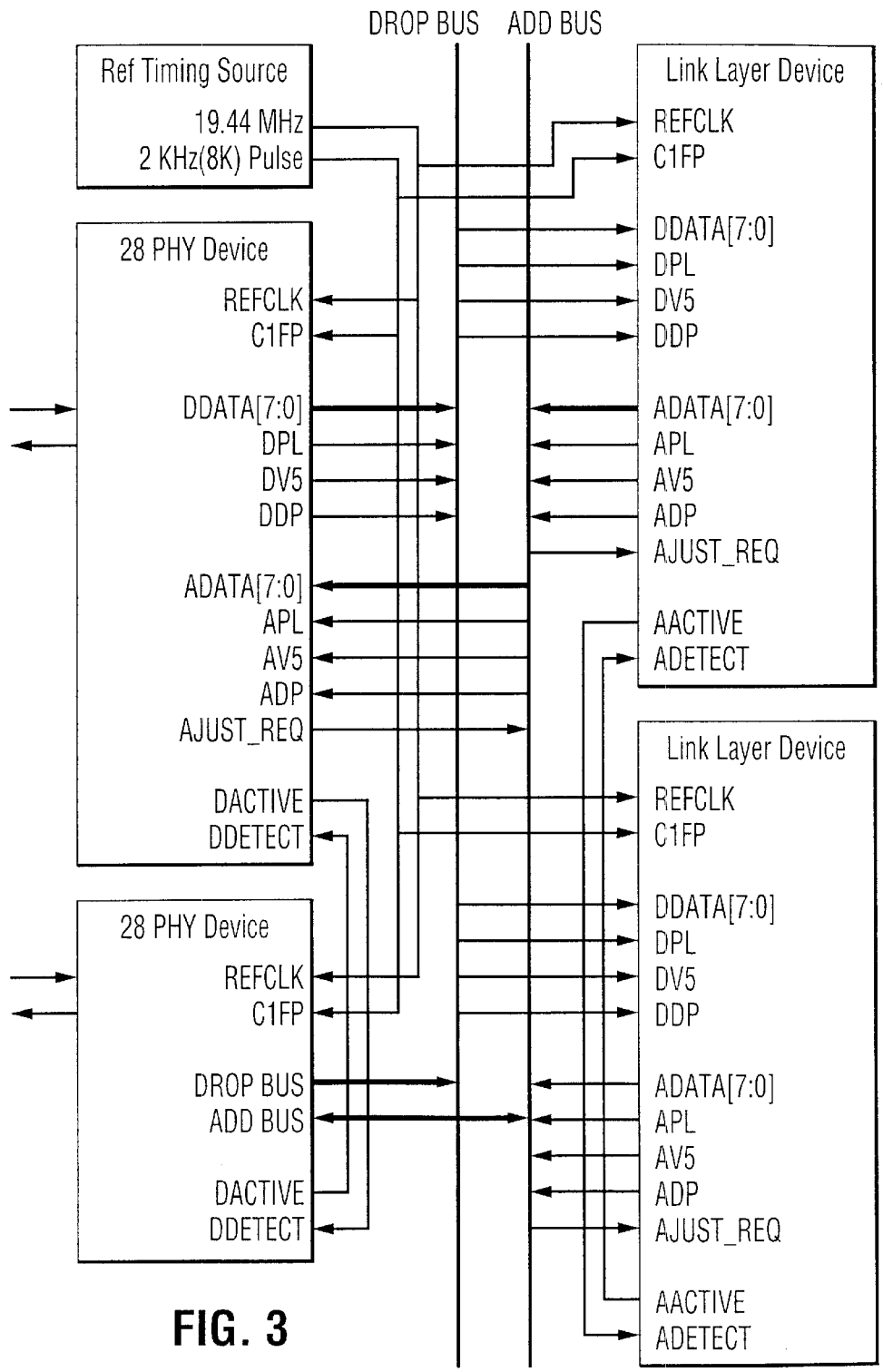
FIG. 3 is a diagram showing the interconnection between multiple physical layer devices with multiple link layer devices.

FIG. 3 illustrates how the scalable bandwidth interconnect interconnects multiple PHY devices with multiple link layer devices.

2 Interface Structure

The SBI multiplexing structure is modeled on the SONET/SDH standards. As much as possible these standards have been followed for leveraged development of this bus interface with SONET/SDH mapped interfaces.

2.1 Supported Interfaces

This bus structure is intended to interconnect various physical layer devices with link layer devices. Therefore, the interfaces that must be supported over this multiplexed bus are varied over a wide range of rates and requirements. Table 4 summarizes the links that are supported within this multiplexed bus structure.

TABLE 4

Supported Links

| Link | Mapping | Timing Method | Channels |
| --- | --- | --- | --- |
| DS3 | Unchannelized DS3 | Floating Payload | 3 |
| E3 | Unchannelized E3 | Floating Payload | 3 |
| T1 | Byte Synchronous | Floating Payload or Locked Payload | 84 |
| E1 | Byte Synchronous | Floating Payload or Locked Payload | 63 |
| TVT1.5 | Transparent | Floating TVT or Locked TVT | 84 |
| TVT2 | Transparent | Floating TVT or Locked TVT | 63 |

This bus provides a lossless interconnect between PHY and link layer devices when using floating structures. Synchronous applications are supported using locked payloads, common reference clocks and elastic stores.

2.2 Scalable Bandwidth Interface Multiplexing Structure

The SBI uses the SONET/SDH virtual tributary structure to carry T1 links, E1 links and TVTs. Unchannelized DS3 and E3 payloads follow a byte synchronous structure modeled on the SONET/SDH format.

The SBI structure uses a locked SONET/SDH structure fixing the position of the AU3/AU4 relative to the STS-3/STM-1 frame. The SBI is also of fixed frequency and alignment as determined by the reference clock (REFCLK) and frame indicator signal (C1FP). Frequency deviations are compensated by adjusting the location of the T1/E1/DS3/E3/TV1.5/TVT2 channels using floating tributaries as determined by the V5 indicator and payload signals (DV5, AV5, DPL and APL). TVTs also allow for synchronous operation where SONET/SDH tributary pointers are carried within the SBI structure in place of the V5 indicator and payload signals (DV5, AV5, DPL and APL).

Table 5 shows the bus structure for carrying T1, E1, TVT1.5, TVT2, DS3 and E3 tributaries in a SDH STM-1 like format. Up to 84 T1 s, 63 E1s, 84TVT1.5s, 63 TVT2s, 3 DS3s or 3 E3s are carried within the octets labeled SPE1, SPE2 and SPE3 in columns 16–270. All other octets are unused and are of fixed position. The frame signal (C1FP) occurs during the octet labeled C1 in row 1, column 7.

The multiplexed links are separated into three Synchronous Payload Envelopes called SPE1, SPE2 and SPE3. Each envelope carries up to 28 T1s, 21 E1s, 28 TVT1.5s, 21 TVT2s, a DS3 or an E3. SPE1 carries the T1s numbered 1,1 through 1,28, E1s numbered 1,1 through 1,21, DS3 number 1,1 or E3 number 1,1. SPE2 carries T1s numbered 2,1 through 2,28, E1s numbered 2,1 through 2,21, DS3 number 2,1 or E3 number 2,1. SPE3 carries T1s numbered 3,1 through 3,28, E1s numbered 3,1 through 3,21, DS3 number 3,1 or E3 number 3,1. TVT1.5s are numbered the same as T1 tributaries and TVT2s are numbered the same as E1 tributaries.

TABLE 5

Structure for Carrying Multiplexed Links

|   | 1 |   | 6 | 7 | 8 |   | 12 | SBI column 13 | 14 | 15 | 16 |   | 268 | 269 | 270 |
|---|---|---|---|---|---|---|----|----|----|----|----|---|-----|-----|-----|
| Row 1 | — | •• | — | C1 | — | •• | — | SPE 1 | SPE 2 | SPE 3 | SPE 1 | •• | SPE 1 | SPE 2 | SPE 3 |
| 2 | — | •• | — | — | — | •• | — | SPE 1 | SPE 2 | SPE 3 | SPE 1 | •• | SPE 1 | SPE 2 | SPE 3 |
| 9 | — |  | — | — | — |  | — | SPE 1 | SPE 2 | SPE 3 | SPE 1 |  | SPE 1 | SPE 2 | SPE 3 |
|  | 1 |  | 2 | 3 | 3 |  | 4 | 5 | 5 | 5 | 6 |  | 90 | 90 | 90 |
|  |  |  |  |  |  |  |  | SPE column |  |  |  |  |  |  |  |

The mappings for each link type are rigidly defined, however the mix of links transported across the bus at any one time is flexible. Each synchronous payload envelope, comprising 86 columns numbered 5 through 90 operates independently allowing a mix of T1s, E1s, TVT1.5s, TVT2s, DS3s and E3s. For example, SPE1 could transport a single DS3, SPE2 could transport a single E3 and SPE3 could transport either 28 T1s or 21 E1 s. Each SPE is restricted to carrying a single tributary type. SBI columns 16–18 are unused for T1, E1, TVT1.5 and TVT2 tributaries.

Tributary numbering for T1 and E1 uses the SPE number, followed by the tributary number within that SPE and are numbered sequentially. Table 6 and table 7 show the T1 and E1 column numbering and relate the tributary number to the SPE column numbers and overall SBI column structure. Numbering for DS3 or E3 follows the same naming convention even though there is only one DS3 or E3 per SPE. TVT1.5s and TVT2s follow the same numbering conventions as T1 and E1 tributaries, respectively.

TABLE 6

T1/TVT1.5 Tributary Column Numbering

| T1# | SPE1 Column | SPE2 Column | SPE3 Column | SBI Column |
|-----|-------------|-------------|-------------|------------|
| 1,1 | 7,35,63 |  |  | 19,103,187 |
| 2,1 |  | 7,35,63 |  | 20,104,188 |
| 3,1 |  |  | 7,35,63 | 21,105,189 |
| 1,2 | 8,36,64 |  |  | 22,106,190 |
| 2,2 |  | 8,36,64 |  | 23,107,191 |
| 1,28 | 34,62,90 |  |  | 100,184,268 |
| 2,28 |  | 34,62,90 |  | 101,185,269 |
| 3,28 |  |  | 34,62,90 | 102,186,270 |

TABLE 7

E1/TVT2 Tributary Column Numbering

| E1# | SPE1 Column | SPE2 Column | SPE3 Column | SBI Column |
|-----|-------------|-------------|-------------|------------|
| 1,1 | 7,28,49,70 |  |  | 19,82,145,208 |
| 2,1 |  | 7,28,49,70 |  | 20,83,146,209 |
| 3,1 |  |  | 7,28,49,70 | 21,84,147,210 |
| 1,2 | 8,29,50,71 |  |  | 22,85,148,211 |
| 2,2 |  | 8,29,50,71 |  | 23,86,149,212 |
| 1,21 | 27,48,69,90 |  |  | 79,142,205,268 |
| 2,21 |  | 27,48,69,90 |  | 80,143,206,269 |
| 3,21 |  |  | 27,48,69,90 | 81,144,207,270 |

2.3 T1 Tributary Mapping

Table 8 shows the format for mapping 84 T1s within the SPE octets. The DS0s and framing bits within each T1 are easily located within this mapping for channelized T1 applications. It is acceptable for the framing bit to not carry a valid framing bit on the ADD BUS since the physical layer device will provide this information. Unframed T1s use the exact same format for mapping 84 T1s into the SBI except that the T1 tributaries need not align with the frame bit and DS0 locations. The V1, V2 and V4 octets are not used to carry T1 data and are either reserved or used for control across the interface. When enabled, the V4 octetis the link rate octed of Table 1. It carries alarm and clock phase information across the SBI bus. The V1 and V2 octets are usused and should be ignored by devices listening to the SBI bus. The V5 and R octets do not carry any information and are fixed to a zero value. The V3 octet carries a T1 data octet but only during rate adjustments as indicated by the V5 indicator signals, DV5 and AV5, and payload signals, DPL and APL. The PPSSSSFR octets carry channel associated signaling (CAS) bits and the T1 framing overhead. The DS0 octets are the 24 DS0 channels making up the T1 link.

The V1, V2, V3 and V4 octets are fixed to the locations shown. All the other octets, shown shaded for T1#1,1 float within the allocated columns maintaining the same order and moving a maximum of one octet per 2 KHz multi-frame. The position of the floating T1 is identified via the V5 indicator signals, DV5B and AV5B, which locate the V5 octet. When the T1 tributary rate is faster than the SBI nominal T1 tributary rate, the T1 tributary is shifted ahead by one octet which is compensated by sending an extra octet in the V3 location. When the T1 tributary rate is slower than the nominal SBI tributary rate the T1 tributary is shifted by one octet which is compensated by inserting a stuff octet in the octet immediately following the V3 octet and delaying the octet that was originally in that position.

TABLE 8

T1 Framing Format

| COL # | T1 #1, 1 | T1 #2, 1–3, 28 | T1 #1, 1 | T1 #2, 1–3, 28 | T1 #1, 1 | T1 #2, 1–3, 28 |
|---|---|---|---|---|---|---|
| Row # | 1–18 | 19 | 20–102 | 103 | 104–186 | 187 | 188–270 |
| 1 | Unused | V1 | Vv1 | V5 | — | PPSSSSFR | — |
| 2 | Unused | DS0#1 | — | DS0#2 | — | DS0#3 | — |
| 3 | Unused | DS0#4 | — | DS0#5 | — | DS0#6 | — |
| 4 | Unused | DS0#7 | — | DS0#8 | — | DS0#9 | — |
| 5 | Unused | DS0#10 | — | DS0#11 | — | DS0#12 | — |
| 6 | Unused | DS0#13 | — | DS0#14 | — | DS0#15 | — |
| 7 | Unused | DS0#16 | — | DS0#17 | — | DS0#18 | — |
| 8 | Unused | DS0#19 | — | DS0#20 | — | DS0#21 | — |
| 9 | Unused | DS0#22 | — | DS0#23 | — | DS0#24 | — |
| 1 | Unused | V2 | V2 | R | — | PPSSSSFR | — |
| 2 | Unused | DS0#1 | — | DS0#2 | — | DS0#3 | — |
| 3 | Unused | DS0#4 | — | DS0#5 | — | DS0#6 | — |
| 4 | Unused | DS0#7 | — | DS0#8 | — | DS0#9 | — |
| 5 | Unused | DS0#10 | — | DS0#11 | — | DS0#12 | — |
| 6 | Unused | DS0#13 | — | DS0#14 | — | DS0#15 | — |
| 7 | Unused | DS0#16 | — | DS0#17 | — | DS0#18 | — |
| 8 | Unused | DS0#19 | — | DS0#20 | — | DS0#21 | — |
| 9 | Unused | DS0#22 | — | DS0#23 | — | DS0#24 | — |
| 1 | Unused | V3 | V3 | R | — | PPSSSSFR | — |
| Row # | 1–18 | 19 | 20–102 | 103 | 104–186 | 187 | |
| 2 | Unused | DS0#1 | — | DS0#2 | — | DS0#3 | — |
| 3 | Unused | DS0#4 | — | DS0#5 | — | DS0#6 | — |
| 4 | Unused | DS0#7 | — | DS0#8 | — | DS0#9 | — |
| 5 | Unused | DS0#10 | — | DS0#11 | — | DS0#12 | — |
| 6 | Unused | DS0#13 | — | DS0#14 | — | DS0#15 | — |
| 7 | Unused | DS0#16 | — | DS0#17 | — | DS0#18 | — |
| 8 | Unused | DS0#19 | — | DS0#20 | — | DS0#21 | — |
| 9 | Unused | DS0#22 | — | DS0#23 | — | DS0#24 | — |
| 1 | Unused | V4 | V4 | R | — | PPSSSSFR | — |
| 2 | Unused | DS0#1 | — | DS0#2 | — | DS0#3 | — |
| 3 | Unused | DS0#4 | — | DS0#5 | — | DS0#6 | — |
| 4 | Unused | DS0#7 | — | DS0#8 | — | DS0#9 | — |
| 5 | Unused | DS0#10 | — | DS0#11 | — | DS0#12 | — |
| 6 | Unused | DS0#13 | — | DS0#14 | — | DS0#15 | — |
| 7 | Unused | DS0#16 | — | DS0#17 | — | DS0#18 | — |
| 8 | Unused | DS0#19 | — | DS0#20 | — | DS0#21 | — |
| 9 | Unused | DS0#22 | — | DS0#23 | — | DS0#24 | — |

The $P_1P_0S_1S_2S_3S_4$ FR octet carries T1 framing in the F bit and channel associated signaling in the $P_1P_0$ and $S_1S_2S_3S_4$ bits. Channel associated signaling is optional. The R bit is reserved and is set to 0. The $P_1P_0$ bits are used to indicate the phase of the channel associated signaling and the $S_1S_2S_3S_4$ bits are the channel associated signaling bits for the 24 DS0 channels in the T1. Table 9 shows the channel associated signaling bit mapping and how the phase bits locate the sixteen state CAS mapping as well as T1 frame alignment for superframe and extended superframe formats. When using four state CAS then the signaling bits are A1–A24, B1–B24, A1–B24, B1–B24 in place of A1–A24, B1–B24, C1–C24, D1–D24. When using 2 state CAS there are only A1–A24 signaling bits.

TABLE 9

T1 Channel Associated Signaling bits

| $S_1$ | $S_2$ | $S_3$ | $S_4$ | SF F | ESF F | $P_1P_2$ |
|---|---|---|---|---|---|---|
| A1 | A2 | A3 | A4 | F1 | M1 | 00 |
| A5 | A6 | A7 | A8 | S1 | C1 | 00 |
| A9 | A10 | A11 | A12 | F2 | M2 | 00 |
| A13 | A14 | A15 | A16 | S2 | F1 | 00 |
| A17 | A18 | A19 | A20 | F3 | M3 | 00 |
| A21 | A22 | A23 | A24 | S3 | C2 | 00 |
| B1 | B2 | B3 | B4 | F4 | M4 | 01 |
| B5 | B6 | B7 | B8 | S4 | F2 | 01 |
| B9 | B10 | B11 | B12 | F5 | M5 | 01 |
| B13 | B14 | B15 | B16 | S5 | C3 | 01 |
| B17 | B18 | B19 | B20 | F6 | M6 | 01 |
| B21 | B22 | B23 | B24 | S6 | F3 | 01 |
| C1 | C2 | C3 | C4 | F1 | M7 | 10 |
| C5 | C6 | C7 | C8 | S1 | C4 | 10 |
| C9 | C10 | C11 | C12 | F2 | M8 | 10 |
| C13 | C14 | C15 | C16 | S2 | F4 | 10 |
| C17 | C18 | C19 | C20 | F3 | M9 | 10 |
| C21 | C22 | C23 | C24 | S3 | C5 | 10 |
| D1 | D2 | D3 | D4 | F4 | M10 | 11 |
| D5 | D6 | D7 | D8 | S4 | F5 | 11 |
| D9 | D10 | D11 | D12 | F5 | M11 | 11 |
| D13 | D14 | D15 | D16 | S5 | C6 | 11 |
| D17 | D18 | D19 | D20 | F6 | M12 | 11 |
| D21 | D22 | D23 | D24 | S6 | F6 | 11 |

T1 tributary asynchronous timing is compensated via the V3 octet as described in section 1.6. T1 tributary link rate adjustments are optionally passed across the SBI via the V4 octet as described in section 1.7. T1 tributary alarm conditions are optionally passed across the SBI bus via the link rate octet in the V4 location as described in section 1.7 and 1.8.

The SBI bus allows for a synchronous T1 mode of operation. In this mode the T1 tributary mapping is fixed to that shown in table 8 and rate justifications are not possible using the V3 octet. The clock rate information within the link rate octet in the V4 location is not used in synchronous mode.

2.4 E1 Tributary Mapping

Table 10 shows the format for mapping 63 E1s within the SPE octets. The timeslots and framing bits within each E1 are easily located within this mapping for channelized E1 applications. It is acceptable for the framing bits to not carry valid framing information on the ADD BUS since the physical layer device will provide this information. Unframed E1s use the exact same format for mapping 63 E1s into the SBI except that the E1 tributaries need not align with the timeslot locations associated with channelized E1 applications. The V1, V2 and V4 octets are not used to carry E1 data and are either reserved or used for control information across the interface. When enabled, the V4 octet carries clock phase information across the SBI. The V1 and V2 octets are unused and should be ignored by devices listening to the SBI bus. The V5 and R octets do not carry any information and are fixed to a zero value. The V3 octet carries an E1 data octet but only during rate adjustments as indicated by the V5 indicator signals, DV5 and AV5, and payload signals, DPL and APL. The PP octets carry channel associated signaling phase information and E1 frame alignment. TS#0 through TS#31 make up the E1 channel.

The V1, V2, V3 and V4 octets are fixed to the locations shown. All the other octets, shown shaded for E1#1,1 float within the allocated columns maintaining the same order and moving a maximum of one octet per 2 KHz multi-frame. The position of the floating E1 is identified via the V5 Indicator signals, DV5 and AV5, which locate the V5 octet. When the E1 tributary rate is faster than the E1 tributary nominal rate, the E1 tributary is shifted ahead by one octet which is compensated by sending an extra octet in the V3 location. When the E1 tributary rate is slower than the nominal rate the E1 tributary is shifted by one octet which is compensated by inserting a stuff octet in the octet immediately following the V3 octet and delaying the octet that was originally in that position.

TABLE 10

E1 Framing Format

| ROW # | COL # 1–18 | E1 #1, 1 19 | #2, 1–3, 21 20–81 | E1 #1, 1 82 | #2, 1–3, 21 83–144 | E1 #1, 1 145 | #2, 1–3, 21 146–207 | E1 #1, 1 208 | #2, 1–3, 21 209–270 |
|---|---|---|---|---|---|---|---|---|---|
| 1 | Unused | v1 | v1 | v5 | — | PP | — | TS#0 | — |
| 2 | Unused | TS#1 | — | TS#2 | — | TS#3 | — | TS#4 | — |
| 3 | Unused | TS#5 | — | TS#6 | — | TS#7 | — | TS#8 | — |
| 4 | Unused | TS#9 | — | TS#10 | — | TS#11 | — | TS#12 | — |
| 5 | Unused | TS#13 | — | TS#14 | — | TS#15 | — | TS#16 | — |
| 6 | Unused | TS#17 | — | TS#18 | — | TS#19 | — | TS#20 | — |
| 7 | Unused | TS#21 | — | TS#22 | — | TS#23 | — | TS#24 | — |
| 8 | Unused | TS#25 | — | TS#26 | — | TS#27 | — | TS#28 | — |
| 9 | Unused | TS#29 | — | TS#30 | — | TS#31 | — | R | — |
| 1 | Unused | V2 | V2 | R | — | PP | — | TS#0 | — |
| 2 | Unused | TS#1 | — | TS#2 | — | TS#3 | — | TS#4 | — |
| 3 | Unused | TS#5 | — | TS#6 | — | TS#7 | — | TS#8 | — |
| 4 | Unused | TS#9 | — | TS#10 | — | TS#11 | — | TS#12 | — |
| 5 | Unused | TS#13 | — | TS#14 | — | TS#15 | — | TS#16 | — |
| 6 | Unused | TS#17 | — | TS#18 | — | TS#19 | — | TS#20 | — |
| 7 | Unused | TS#21 | — | TS#22 | — | TS#23 | — | TS#24 | — |
| 8 | Unused | TS#25 | — | TS#26 | — | TS#27 | — | TS#28 | — |

TABLE 10-continued

E1 Framing Format

| ROW # | COL # 1–18 | E1 #1, 1 19 | #2, 1–3, 21 20–81 | E1 #1, 1 82 | #2, 1–3, 21 83–144 | E1 #1, 1 145 | #2, 1–3, 21 146–207 | E1 #1, 1 208 | #2, 1–3, 21 209–270 |
|---|---|---|---|---|---|---|---|---|---|
| 9 | Unused | TS#29 | — | TS#30 | — | TS#31 | — | R | — |
| 1 | Unused | V3 | V3 | R | — | PP | — | TS#0 | — |
| 2 | Unused | TS#1 | — | TS#2 | — | TS#3 | — | TS#4 | — |
| 3 | Unused | TS#5 | — | TS#6 | — | TS#7 | — | TS#8 | — |
| 4 | Unused | TS#9 | — | TS#10 | — | TS#11 | — | TS#12 | — |
| 5 | Unused | TS#13 | — | TS#14 | — | TS#15 | — | TS#16 | — |
| 6 | Unused | TS#17 | — | TS#18 | — | TS#19 | — | TS#20 | — |
| 7 | Unused | TS#21 | — | TS#22 | — | TS#23 | — | TS#24 | — |
| 8 | Unused | TS#25 | — | TS#26 | — | TS#27 | — | TS#28 | — |
| 9 | Unused | TS#29 | — | TS#30 | — | TS#31 | — | R | — |
| 1 | Unused | V4 | V4 | R | — | PP | — | TS#0 | — |
| 2 | Unused | TS#1 | — | TS#2 | — | TS#3 | — | TS#4 | — |
| 3 | Unused | TS#5 | — | TS#6 | — | TS#7 | — | TS#8 | — |
| 4 | Unused | TS#9 | — | TS#10 | — | TS#11 | — | TS#12 | — |
| 5 | Unused | TS#13 | — | TS#14 | — | TS#15 | — | TS#16 | — |
| 6 | Unused | TS#17 | — | TS#18 | — | TS#19 | — | TS#20 | — |
| 7 | Unused | TS#21 | — | TS#22 | — | TS#23 | — | TS#24 | — |
| 8 | Unused | TS#25 | — | TS#26 | — | TS#27 | — | TS#28 | — |
| 9 | Unused | TS#29 | — | TS#30 | — | TS#31 | — | R | — |

When using channel associated signaling (CAS), TS#16 carries the ABCD ing bits and the timeslots 17 through 31 are renumbered 16 through 30. The PP octet is 0h for all frames except for the frame which carries the CAS for timeslots 15/30 at which time the PP octet is C0h. The first octet of the CAS multi-frame, RRRRRRRR, is reserved and should be ignored by the receiver when CAS signaling is enabled. Table 11 shows the format of timeslot 16 when carrying channel associated signaling.

TABLE 11

E1 Channel Associated Signaling bits

| TS#116[0:3] | TS#16[4:7] | PP |
|---|---|---|
| RRRR | RRRR | 00 |
| ABCD1 | ABCD16 | 00 |
| ABCD2 | AABCD17 | 00 |
| ABCD3 | ABCD18 | 00 |
| ABCD4 | ABCD19 | 00 |
| ABCD5 | ABCD20 | 00 |
| ABCD6 | ABCD21 | 00 |
| ABCD7 | ABCD22 | 00 |
| ABCD8 | ABCD23 | 00 |
| ABCD9 | ABCD24 | 00 |
| ABCD10 | ABCD25 | 00 |
| ABCD11 | ABCD26 | 00 |
| ABCD12 | ABCD27 | 00 |
| ABCD13 | ABCD28 | 00 |
| ABCD14 | ABCD29 | 00 |
| ABCD15 | ABCD30 | 00 |

E1 tributary asynchronous timing is compensated via the V3 octet as described in section 1.6. E1 tributary link rate adjustments are optionally passed across the SBI via the V4 octet as described in section 1.7. E1 tributary alarm conditions are optionally passed across the SBI bus via the link rate octet in the V4 location as described in section 1.7 and 1.8.

The SBI bus allows for a synchronous E1 mode of operation. In this mode the E1 tributary mapping is fixed to that shown in table 10 and rate justifications are not possible using the V3 octet. The clock rate information within the link rate octet in the V4 location is not used in synchronous mode.

2.5 DS3 Tributary Mapping

Table 12 shows a DS3 tributary mapped within the first synchronous payload envelope SPE1 The V5 indicator pulse identifies the V5 octet. The DS3 framing format does not follow an 8 KHz frame period so the floating DS3 multi-frame located by the V5 indicator, shown in heavy border grey region in table 12, will jump around relative to the H1 frame on every pass. In fact, the V5 indicator will often be asserted twice per H1 frame, as is shown by the second V5 octet in table 12. The V5 indicator and payload signals indicate negative and positive rate adjustments which are carrried out by either putting a data byte in the H3 octet or leaving empty the octet after H3 octet.

TABLE 12

DS3 Framing Format

| ROW | SPE COL# SBI COL # 1,4,7,10 | 13 | DS3 1 16 | DS3 2–56 | DS3 57 184 | DS3 58–84 | DS3 Col 85 268 |
|---|---|---|---|---|---|---|---|
| 1 | Unused | H1 | V5 | DS3 | DS3 | DS3 | DS3 |
| 2 | Unused | H2 | DS3 | DS3 | DS3 | DS3 | DS3 |
| 3 | Unused | H3 | DS3 | DS3 | DS3 | DS3 | DS3 |
| 4 | Unused | Linkrate | DS3 | DS3 | DS3 | DS3 | DS3 |
| 5 | Unused | Unused | DS3 | DS3 | DS3 | DS3 | DS3 |
| 6 | Unused | Unused | DS3 | DS3 | DS3 | DS3 | DS3 |
| 7 | Unused | Unused | DS3 | DS3 | D53 | DS3 | DS3 |
| 8 | Unused | Unused | DS3 | DS3 | V5 | DS3 | DS3 |
| 9 | Unused | Unused | DS3 | DS3 | DS3 | DS3 | DS3 |

Because the DS3 tributary rate is less than the rate of the grey region, padding octets are interleaved with the DS3 tributary to make up the difference in rate. Interleaved with every DS3 multi-frame are 35 stuff octets, one of which is the V5 octet. These 35 stuff octets are spread evenly across seven DS3 subframes. Each DS3 subframe is eight blocks of 85 bits. The 85 bits making up a DS3 block are padded out to be 11 octets. Table 13 shows the DS3 block 11 octet format where R indicates a stuff bit, F indicates a DS3 framing bit and I indicates DS3 information bits. Table 14 shows the DS3 multi-frame format that is packed into the grey region of table 12. In this table, V5 indicates the V5 octet which is also a stuff octet, R indicates a stuff octet and B indicates the 11 octet DS3 block. Each row in table 14 is a DS3 multi-frame. The DS3 multi-frame stuffing format is identical for 5 multi-frames and then an extra stuff octet after the V5 octet is added every sixth frame.

TABLE 13

DS3 Block Format

| | | | | | Octet # | | | | | | |
|---|---|---|---|---|---|---|---|---|---|---|---|
| | 1 | 2 | 3 | 4 | 5 | 6 | 7 | 8 | 9 | 10 | 11 |
| Data | RRRFIIII | 8*I | 8*I | 8*I | 8*I | 8*I | 8*I | 8*I | 8*I | 8*I | 8*I |

TABLE 14

DS3 Multi-frame Stuffing Format

| V5 | 4*R | 8*B | 5*R | 8*B | 5*R | 8*B | 5*R | 8*B | 5*R | 8*B | 5*R | 8*B | 5*R | 8*B |
|----|-----|-----|-----|-----|-----|-----|-----|-----|-----|-----|-----|-----|-----|-----|
| V5 | 4*R | 8*B | 5*R | 8*B | 5*R | 8*B | 5*R | 8*B | 5*R | 8*B | 5*R | 8*B | 5*R | 8*B |
| V5 | 4*R | 8*B | 5*R | 8*B | 5*R | 8*B | 5*R | 8*B | 5*R | 8*B | 5*R | 8*B | 5*R | 8*B |
| V5 | 4*R | 8*B | 5*R | 8*B | 5*R | 8*B | 5*R | 8*B | 5*R | 8*B | 5*R | 8*B | 5*R | 8*B |
| V5 | 4*R | 8*B | 5*R | 8*B | 5*R | 8*B | 5*R | 8*B | 5*R | 8*B | 5*R | 8*B | 5*R | 8*B |
| V5 | 5*R | 8*B | 5*R | 8*B | 5*R | 8*B | 5*R | 8*B | 5*R | 8*B | 5*R | 8*B | 5*R | 8*B |

DS3 asynchronous timing is compensated via the H3 octet as described in section 1.6. DS3 link rate adjustments are optionally passed across the SBI via the Linkrate octet as described in section 1.7. DS3 alarm conditions are optionally passed across the SBI bus via the Linkrate octet as described in section 1.7 and 1.8.

2.6 E3 Tributary Mapping

Table 15 shows a E3 tributary mapped within the first synchronous payload envelope SPE1. The V5 indicator pulse identifies the V5 octet. The E3 framing format does not follow an 8 KHz frame period so the floating frame located by the V5 indicator and shown in grey in Table 15, will jump around relative to the H1 frame on every pass. In fact the V5 indicator will be asserted two or three times per H1 frame, as is shown by the second and third V5 octet in Table 15. The V5 indicator and payload signals indicate negative and positive rate adjustments which are carried out by either putting a data byte in the H3 octet or leaving empty the octet after the H3 octet.

TABLE 15

E3 Framing Format

| | SPE COL # | | E3 1 | E3 2–18 | E3 19 | E3 20–38 | E3 39 | E3 40–84 | E3 85 |
|---|---|---|---|---|---|---|---|---|---|
| ROW | SBI COL # 1, 4, 7, 10 | 13 | 16 | ... | 70 | ... | 130 | ... | 268 |
| 1 | Unused | H1 | V5 | E3 | E3 | E3 | E3 | E3 | E3 |
| 2 | Unused | H2 | E3 | E3 | E3 | E3 | E3 | E3 | E3 |
| 3 | Unused | H3 | E3 | E3 | E3 | E3 | E3 | E3 | E3 |
| 4 | Unused | Linkrate | E3 | E3 | V5 | E3 | E3 | E3 | E3 |
| 5 | Unused | Unused | E3 | E3 | E3 | E3 | E3 | E3 | E3 |
| 6 | Unused | Unused | E3 | E3 | E3 | E3 | E3 | E3 | E3 |
| 7 | Unused | Unused | E3 | E3 | E3 | E3 | V5 | E3 | E3 |
| 8 | Unused | Unused | E3 | E3 | E3 | E3 | E3 | E3 | E3 |
| 9 | Unused | Unused | E3 | E3 | E3 | E3 | E3 | E3 | E3 |

Because the E3 tributary rate is less than the rate of the grey region, padding octets are interleaved with the E3 tributary to make up the difference in rate. Interleaved with every E3 frame is an alternating pattern of 81 and 82 stuff octets, one of which is the V5 octet. These 81 or 82 stuff octets are spread evenly across the E3 frame. Each E3 subframe is 48 octets which is further broken into 4 equal blocks of 12 octets each. Table 16 shows the alternating E3 frame stuffing format that is packed into the grey region of table 15. Note that there are 6 stuff octets after the V5 octet in one frame and 5 stuff octets after the V5 octet in the next frame. In this table, V5 indicates the V5 octet which is also a stuff octet, R indicates a stuff octet, D indicates an E3 data octet, FAS indicates the first byte of the 10 bit E3 Frame Alignment Signal.

TABLE 16

E3 FrameStuffingFormat

| V5 | 6*R | FAS | 11*D | 5*R | 12*D | 5*R | 12*D | 5*R | 12*D |
|----|-----|-----|------|-----|------|-----|------|-----|------|
|    | 5*R | FAS | 11*D | 5*R | 12*D | 5*R | 12*D | 5*R | 12*D |
|    | 5*R | FAS | 11*D | 5*R | 12*D | 5*R | 12*D | 5*R | 12*D |
|    | 5*R | FAS | 11*D | 5*R | 12*D | 5*R | 12*D | 5*R | 12*D |
| V5 | 5*R | FAS | 11*D | 5*R | 12*D | 5*R | 12*D | 5*R | 12*D |
|    | 5*R | FAS | 11*D | 5*R | 12*D | 5*R | 12*D | 5*R | 12*D |
|    | 5*R | FAS | 11*D | 5*R | 12*D | 5*R | 12*D | 5*R | 12*D |
|    | 5*R | FAS | 11*D | 5*R | 12*D | 5*R | 12*D | 5*R | 12*D |

E3 asynchronous timing is compensated via the H3 octet as described in section 1.6. E3 link rate adjustments are optionally passed across the SBI via the Linkrate octet as described in section 1.7. E3 alarm conditions are optionally passed across the SBI bus via the Linkrate octet as described in section 1.7 and 1.8.

2.8 Transparent VT1.5/TU11 Format

VT1.5 and TU11 virtual tributaries, TVT1.5s, are transported across the SBI bus in a similar manner to the T1 tributary mapping. Table 17 shows the transparent structure where "I" is used to indicate information bytes. There are two options when carrying virtual tributaries on the SBI bus, the primary difference being how the floating V5 payload is located.

The first option is locked TVT mode which carries the entire VT1.5/TU11 virtual tributary indicated by the shaded region in table 17. Locked is used to indicate that the location of the V1, V2 pointer is locked. The virtual tributary must have a valid V1, V2 pointer to locate the V5 payload. In this mode the V5 indicator and payload signals, DV5, AV5, DPL and APL, may be generated but must be ignored by the receiving device. In locked mode, timing is always sourced by the transmitting side, therefore justification requests are not used and the AJUST_REQ signal is ignored. Other than the V1 and V2 octets which must carry valid pointers, all octets can carry data in any format. The location of the V1, V2, V3 and V4 octets is fixed to the locations shown in table 17.

The second option is floating TVT mode which carries the payload comprised of the V5 and I octets within the shaded region of table 17. In this mode the V1, V2 pointers are still in a fixed location and may be valid but are ignored by the receiving device. The V5 indicator and payload signals, DV5, AV5, DPL and APL, must be valid and are used to locate the floating payload. The justification request signal can be used to control the timing on the ADD BUS. The location of the V1, V2, V3 and V4 octets is fixed to the locations shown in Table 17.

TABLE 17

Transparent VT1.5/TU11 Format

| ROW # | COL # 1–18 | VT1.5 #1, 1 19 | #2, 1–3, 28 20–102 | VT1.5 #1, 1 103 | #2, 1–3, 28 104–186 | VT1.5 #1, 1 187 | #2, 1–3, 28 188–270 |
|---|---|---|---|---|---|---|---|
| 1 | Unused | V1 | V1 | VS | — | I | — |
| 2 | Unused | I | — | I | — | I | — |
| 3 | Unused | I | — | I | — | I | — |
| 4 | Unused | I | — | I | — | I | — |
| 5 | Unused | I | — | I | — | I | — |
| 6 | Unused | I | — | 1 | — | I | — |
| 7 | Unused | I | — | I | — | I | — |
| 8 | Unused | I | — | I | — | I | — |
| 9 | Unused | I | — | I | — | I | — |
| 1 | Unused | V2 | V2 | I | — | I | — |
| 2 | Unused | I | — | I | — | I | — |
| 3 | Unused | I | — | I | — | I | — |
| 4 | Unused | I | — | I | — | I | — |
| 5 | Unused | I | — | I | — | I | — |
| 6 | Unused | I | — | I | — | I | — |
| 7 | Unused | I | — | I | — | I | — |
| 8 | Unused | I | — | I | — | I | — |
| 9 | Unused | I | — | I | — | I | — |
| 1 | Unused | V3 | V3 | I | — | I | — |
| 2 | Unused | I | — | I | — | I | — |
| 3 | Unused | I | — | I | — | I | — |
| 4 | Unused | I | — | I | — | I | — |
| 5 | Unused | I | — | I | — | I | — |
| 6 | Unused | I | — | I | — | I | — |
| 7 | Unused | I | — | I | — | I | — |
| 8 | Unused | I | — | I | — | I | — |
| 9 | Unused | I | — | I | — | I | — |
| 1 | Unused | V4 | V4 | I | — | I | — |
| 2 | Unused | I | — | I | — | I | — |
| 3 | Unused | I | — | I | — | I | — |
| 4 | Unused | I | — | I | — | I | — |
| 5 | Unused | I | — | I | — | I | — |
| 6 | Unused | I | — | I | — | I | — |
| 7 | Unused | I | — | I | — | I | — |
| 8 | Unused | I | — | I | — | I | — |
| 9 | Unused | I | — | I | — | I | — |

2.9 Transparent VT2/TU12 Mapping

VT2 and TU12 virtual tributaries, TVT2s, are transported across the SBI bus in a similar manner to the E1 tributary mapping. Table 18 shows the transparent structure where "I" is used to indicate information bytes. There are two options when carrying virtual tributaries on the SBI bus, the primary difference being how the floating V5 payload is located.

The first option is locked TVT mode which carries the entire VT2/TU12 virtual tributary indicated by the shaded region in table 18. Locked is used to indicate that the location of the V1, V2 pointer is locked. The virtual tributary must have a valid V1, V2 pointer to locate the V5 payload. In this mode the V5 indicator and payload signals, DV5, AV5, DPL and APL, are optionally generated but must be ignored by the receiving device. In locked mode timing is always sourced by the transmitting side, therefore justification requests are not used and the AJUST_REQ signal is ignored. Other than the V1 and V2 octets which are carrying valid pointers, all octets can carry data in any format. The location of the V1, V2, V3 and V4 octets is fixed to the locations shown in table 18.

The second option is floating TVT mode, which carries the payload, comprised of the V5 and I octets within the shaded region of table 18. In this mode the V1, V2 pointers are still in a fixed location and may be valid but are ignored by the receiving device. The V5 indicator and payload signals, DV5, AV5, DPL and APL, must be valid and are used to locate the floating payload. The justification request signal can be used to control the timing on the ADD BUS. The location of the V1, V2, V3 and V4 octets is fixed to the locations shown in table 18.

TABLE 18

Transparent VT2/TUI2 Format

| ROW # | COL # 1–18 | E1 #1, 1 19 | #2, 1–3, 21 20–81 | E1 #1, 1 82 | #2, 1–3, 21 83–144 | E1 #1, 1 145 | #2, 1–3, 21 146–207 | E1 #1, 1 208 | #2, 1–3, 21 209–270 |
|---|---|---|---|---|---|---|---|---|---|
| 1 | Unused | V1 | V1 | V5 | — | I | — | I | — |
| 2 | Unused | I | — | I | — | I | — | I | — |
| 3 | Unused | I | — | I | — | I | — | I | — |
| 4 | Unused | I | — | I | — | I | — | I | — |
| 5 | Unused | I | — | I | — | I | — | I | — |
| 6 | Unused | I | — | I | — | I | — | I | — |
| 7 | Unused | I | — | I | — | I | — | I | — |
| 8 | Unused | I | — | I | — | I | — | I | — |
| 9 | Unused | I | — | I | — | I | — | I | — |
| 1 | Unused | V2 | V2 | I | — | I | — | I | — |
| 2 | Unused | I | — | I | — | I | — | I | — |
| 3 | Unused | I | — | I | — | I | — | I | — |
| 4 | Unused | I | — | I | — | I | — | I | — |
| 5 | Unused | I | — | I | — | I | — | I | — |
| 6 | Unused | I | — | I | — | I | — | I | — |
| 7 | Unused | I | — | I | — | I | — | I | — |
| 8 | Unused | I | — | I | — | I | — | I | — |
| 9 | Unused | I | — | I | — | I | — | I | — |
| 1 | Unused | V3 | V3 | I | — | I | — | I | — |
| 2 | Unused | I | — | I | — | I | — | I | — |
| 3 | Unused | I | — | I | — | I | — | I | — |
| 4 | Unused | I | — | I | — | I | — | I | — |
| 5 | Unused | I | — | I | — | I | — | I | — |
| 6 | Unused | I | — | I | — | I | — | I | — |
| 7 | Unused | I | — | I | — | I | — | I | — |
| 8 | Unused | I | — | I | — | I | — | I | — |
| 9 | Unused | I | — | I | — | I | — | I | — |
| 1 | Unused | V4 | V4 | I | — | I | — | I | — |
| 2 | Unused | I | — | I | — | I | — | I | — |
| 3 | Unused | I | — | I | — | I | — | I | — |
| 4 | Unused | I | — | I | — | I | — | I | — |
| 5 | Unused | I | — | I | — | I | — | I | — |
| 6 | Unused | I | — | I | — | I | — | I | — |
| 7 | Unused | I | — | I | — | I | — | I | — |
| 8 | Unused | I | — | I | — | I | — | I | — |
| 9 | Unused | I | — | I | — | I | — | I | — |

3 Drop Bus Interface Description

The DROP BUS is a byte wide serial bus, which drops SBI tributaries from multiple PHY devices to multiple link layer devices.

3.1 Bus Signals

| Pin Name | Direction | Function |
|---|---|---|
| REFCLK | input | Reference Clock (REFCLK). This signal is an externally generated 19.44 MHz +/− 50 ppm clock with a nominal 50% duty cycle. Since the ADD and DROP busses are locked together this clock is common to both the add and drop sides of the SBI bus. |
| C1FP | input | C1 Frame Pulse (C1FP). This signal is single sourced to indicate the first C1 octet on the SBI bus. Since the ADD and DROP busses are locked together this signal is common to both the add and drop sides of the SBI bus.<br>This frame pulse indicator is a single REFCLK cycle long and is updated on the rising edge of REFCLK. All devices should sample this signal on the rising edge of REFCLK.<br>This signal also indicates multiframe alignment which occurs every 4 frames, therefore this signal is pulsed every fourth C1 octet to produce a 2 KHz multiframe signal. The frame pulse does not need to be repeated every 2 KHz therefore all SBI devices should synchronize to this signal but should also be able to flywheel in its absence.<br>When using the SBI bus in synchronous mode the C1FP signal can be used to indicate T1 and E1 multiframe alignment by pulsing on 48 SBI frame boundaries. |
| DDATA[7:0] | PHY tristate output<br>link layer input | DROP BUS Data (DDATA[7:0]). The Drop data bus is a time division multiplexed bus which transports tributaries by assigning them to fixed octets within the SBI bus structure.<br>Multiple PHY devices can drive this bus at uniquely assigned tributary columns within the SBI bus structure.<br>DDATA[7.0] is asserted and sampled on the rising edge of REFCLK. |
| DDP | PHY tristate output<br>link layer input | DROP BUS Data Parity (DDP). This signal carries the even or odd parity for the DROP BUS signals. The parity calculation encompasses the DDATA[7:0], DPL and DV5 signals.<br>Multiple PHY devices can drive this signal at uniquely assigned tributary columns within the SBI bus structure. This parity signal is intended to detect multiple sources in the column assignment.<br>DDP is asserted and sampled on the rising edge of REFCLK. |
| DPL | PHY tristate output<br>link layer input | DROP BUS Payload (DPL). This active high signal indicates valid data within the SBI bus structure. This signal is high during all octets making up a tributary which includes all octets shaded grey in the framing format tables. This signal goes high during the V3 or H3 octet within a tributary to accommodate negative timing adjustments between the tributary rate and the fixed SBI bus structure. This signal goes low during the octet following the V3 or H3 octet within a tributary to accommodate positive timing adjustments between the tributary rate and the fixed SBI bus structure.<br>Multiple PHY devices can drive this signal at uniquely assigned tributary columns within the SBI bus structure.<br>In locked TVT mode this signal may be driven but is ignored by the receiving device.<br>DPL is asserted and sampled on the rising edge of REFCLK. |
| DV5 | PHY tristate output<br>link layer input | DROP BUS Payload Indicator (DV5). This active high signal locates the position of the floating payloads for each tributary within the SBI bus structure. Timing differences between the link timing and the SBI bus timing are indicated by adjustments |

-continued 3.1 Bus Signals

| Pin Name | Direction | Function |
|---|---|---|
| | | of this payload indicator relative to the fixed SBI bus structure. Multiple PHY devices can drive this signal at uniquely assigned tributary columns within the SBI bus structure. All movements indicated by this signal must be accompanied by appropriate adjustments in the DPL signal. In locked TVT mode this signal may be driven but must be ignored by the receiving device. DV5 is asserted and sampled on the rising edge of REFCLK. |
| DACTIVE | PHY Output | DROP BUS Active Indicator (DACTIVE). This active high signal is asserted high during all octets when driving data and control signals, DDATA[7:0], DDP DPL and DV5, onto the bus. All other SBI PHY devices driving the bus listen to this signal on DDETECT to detect multiple sources driving the bus which can occur due to configuration problems. DACTIVE is asserted on the rising edge of REFCLK. |
| DDETECT | PHY Input | DROP BUS Active Detector (DDETECT). This input listens to the OR of all other SBI DROP BUS masters. A PHY device will listen to the OR of all other PHY device DACTIVE signals. When a device is driving DACTIVE high and detects DDETECT is high from another device, it signals a collision and backs off driving the bus to minimize or eliminate contention. Some SBI devices may provide multiple DDETECT signals which are internally ORed together. DDETECT is an asynchronous signal which must be used to disable the tristate drivers on the DROP BUS. The AND of DACTIVE and DDETECT is sampled on the rising edge of REFCLK to indicate that a collision occurred and can be used to indicate contention to management procedures. |

Notes on Pin Description

1. All outputs on the SBI bus are open drain outputs. Output drive is recommended 8 mA to handle capacitative loads up to 100 pF with 10K Ohms connecting to 3.3V.

3.2 DROP BUS Functional Timing

Figure 4:
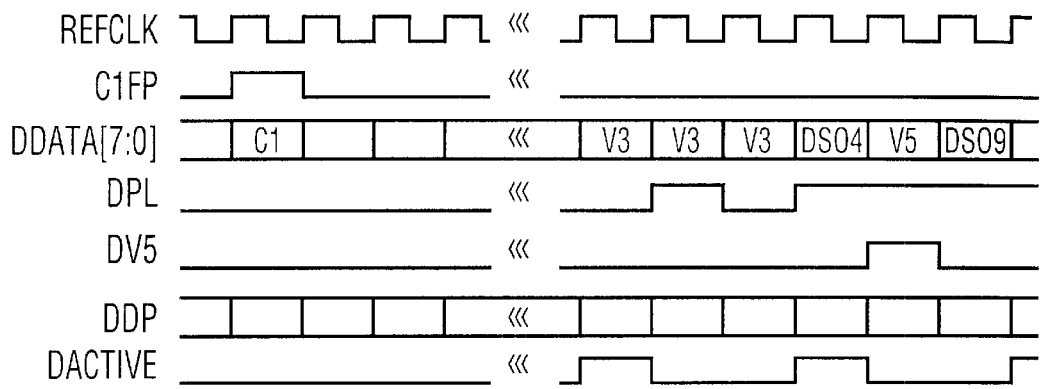
FIG. 4 is a timing diagram showing the T1/E1 DROP BUS functional timing showing a negative justification on the second to last V3 octet.

FIG. 4 shows a negative justification on the second to last V3 octet. This is indicated by asserting DPL high during the V3 octet. The timing diagram also shows the location of one of the tributaries by asserting DV5 high during the V5 octet. The DACTIVE signal indicates an SBI PHY device which is sourcing all tributaries in the first SPE. Note: DACTIVE is not asserted high during the unused columns of all tributary mappings.

Figure 5:
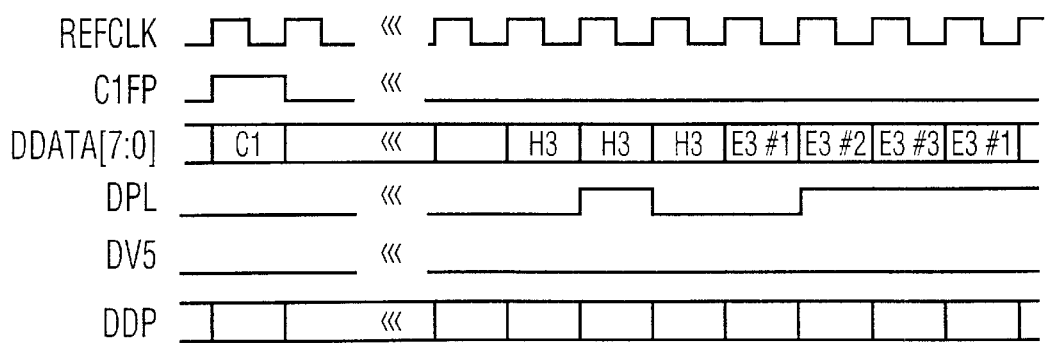
FIG. 5 is a timing diagram showing the DS3/E3 DROP BUS function timing showing three E3 tributaries mapped onto the SBI bus.

FIG. 5 shows three E3 tributaries mapped onto the SBI bus. A negative justification is shown for E3#2 during the H3 octet with DPL asserted high. A positive justification is shown for E3#1 during the first E3#1 octet after H3 which has DPL asserted low.

3.3 DROP BUS Interface Timing Characteristics

Figure 6:
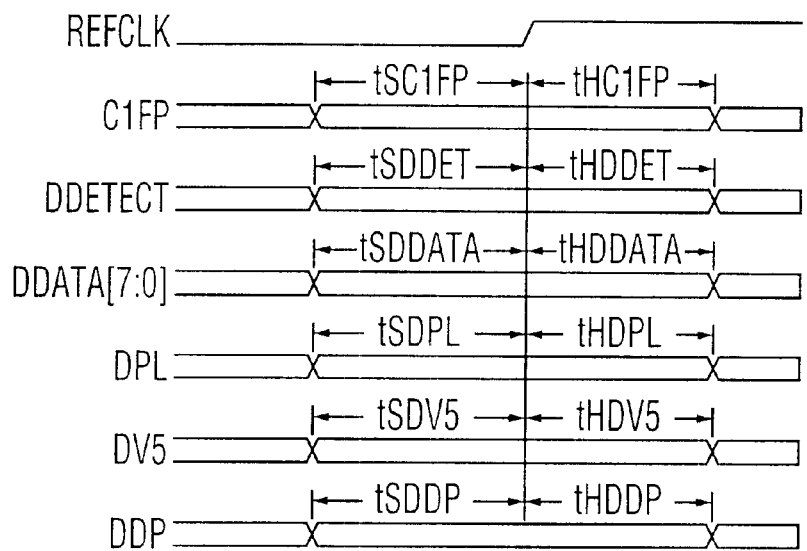
FIG. 6 is a diagram of the DROP BUS input interface timing.
Figure 7:
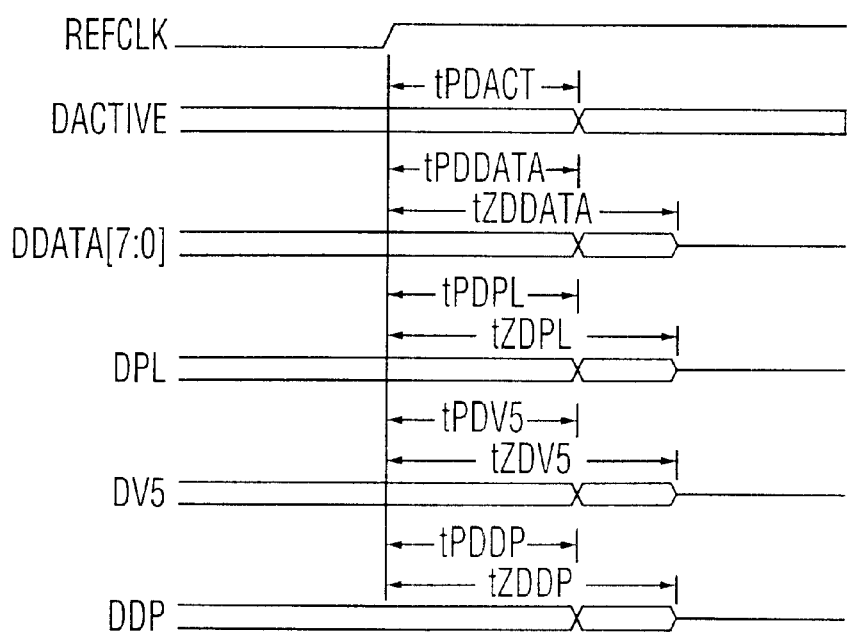
FIG. 7 is a diagram of the DROP BUS output interface timing.
Figure 8:
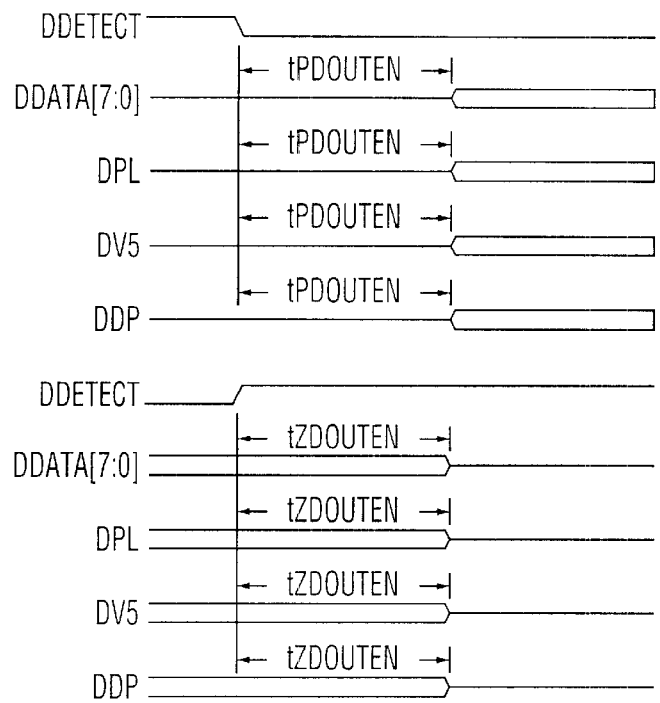
FIG. 8 is a diagram of the DROP BUS asynchronous output interface timing.

The DROP BUS interface input and output timing is indicated in tabular form in tables 19, 20 and 21 while the T1/E1 DROP BUS timing diagrams are shown in FIGS. 6, 7 and 8.

TABLE 19

Drop Bus Interface Input Timing
(TC = −40° C. to +85° C., VDD = 3.3 V ± 10%)

| Symbol | Parameter | Min | Max | Units |
|---|---|---|---|---|
| tSC1FP | REFCLK to Valid C1FP Set-up Time | 4 | | ns |
| tHC1FP | REFCLK to Valid C1FP Hold Time | 0 | | ns |
| tSDDET | REFCLK to Valid DDETECT Set-up Time | 20 | | ns |
| tHDDET | REFCLK to Valid DDETECT Hold Time | 0 | | ns |
| tSDDATA | REFCLK to Valid DDATA Set-up Time | 4 | | ns |
| tHDDATA | REFCLK to Valid DDATA Hold Time | 0 | | ns |
| tSDPL | REFCLK to Valid DPL Set-up Time | 4 | | ns |
| tHDPL | REFCLK to Valid DPL Hold Time | 0 | | ns |
| tSDV5 | REFCLK to Valid DV5 Set-up Time | 4 | | ns |
| tHDV5 | REFCLK to Valid DV5 Hold Time | 0 | | ns |
| tSDDP | REFCLK to Valid DDP Set-up Time | 4 | | ns |
| tHDDP | REFCLK to Valid DDP Hold Time | 0 | | ns |

TABLE 20

DROP BUS Interface Output Timing

| Symbol | Parameter | Min | Max | Units |
|---|---|---|---|---|
| tPDACT | REFCLK Edge to DACT Prop Delay | | 15 | ns |
| tPDDATA | REFCLK Edge to DDATA Prop Delay (consecutive tributary assignment) | | 20 | ns |

TABLE 20-continued

DROP BUS Interface Output Timing

| Symbol | Parameter | Min | Max | Units |
|---|---|---|---|---|
| tZDDATA | REFCLK Edge to DDATA Output Tri-state (non-consecutive tributary assignment) | | 15 | ns |
| tPDPL | REFCLK Edge to DPL Prop Delay (consecutive tributary assignment) | | 20 | ns |
| tZDPL | REFCLK Edge to DPL Output Tri-state (non-consecutive tributary assignment) | | 15 | ns |
| tPDV5 | REFCLK Edge to DV5 Prop Delay (consecutive tributary assignment) | | 20 | ns |
| tZDV5 | REFCLK Edge to DV5 Output Tri-state (non-consecutive tributary assignment) | | 15 | ns |
| tPDDP | REFCLK Edge to DDP Prop Delay (consecutive tributary assignment) | | 20 | ns |
| tZDDP | REFCLK Edge to DDP Output Tri-state (non-consecutive tributary assignment) | | 15 | ns |

TABLE 21

DROP BUS Asynchronous Output Interface Timing

| Symbol | Parameter | Min | Max | Units |
|---|---|---|---|---|
| tPDOUTEN | Asynchronous DDETECT Low to DDATA[7:0], DPL, DV5, DDP Prop Delay | | 12 | ns |
| tZDOUTEN | Asynchronous DDETECT High to DDATA[7:0], DPL, DV5, DDP High Impedance | | 12 | ns |

4 ADD BUS Interface Description

The ADD BUS is a byte wide serial bus, which aggregates time division multiplexed tributaries from multiple link layer devices to multiple PHY devices. Some signals within this bus are also driven by PHY devices in order to communicate transmit timing from the PHY devices to the link layer devices on a per tributary basis. The ADD BUS timing signals are shown in FIGS. 9, 10, 11 and 12.

4.1 ADD BUS Signals

| Pin Name | Direction | Function |
|---|---|---|
| REFCLK | Input | Reference Clock (REFCLK). See Description in DROP BUS Interface Description Section. This signal is common to both buses. |
| C1FP | Input | C1 Frame Pulse (C1FP). See Description in DROP BUS Interface Description section. This signal is common to both buses. |
| ADATA[7:0] | link layer tristate output PHY input | Add Data (ADATA[7:0]). The Add data bus is a time division multiplexed bus, which transports tributaries by assigning them to fixed octets within the SBI bus structure. This bus has multiple sources which are each assigned unique fixed octets within the SBI bus structure. DDATA[7:0] is asserted and sampled on the rising edge of REFCLK. |
| ADP | link layer tristate output PHY input | ADD BUS Data Parity (ADP). This signal carries the even or odd parity for the ADD BUS signals. The parity calculation encompasses ADATA[7:0], APL and AV5 signals. Multiple link layer devices can drive this signal at uniquely assigned tributary columns within the SBI bus structure. This parity signal is intended to detect conflicts in the tributary assignment. ADP is asserted and sampled on the rising edge of REFCLK. |
| APL | link layer tristate output PHY input | ADD BUS Payload (APL). This signal indicates valid data within the SBI bus structure. This active high signal is asserted during all octets making up a tributary. This signal goes high during the V3 or H3 octet within a tributary to accommodate negative timing adjustments between the tributary rate and the fixed SBI bus structure. This signal goes low during the octet after the V3 or H3 octet within a tributary to accommodate positive timing adjustments between the tributary rate and the fixed SBI bus structure. Multiple link layer devices can drive this signal at uniquely assigned tributary columns within the SBI bus structure. In locked TVT mode this signal may be driven but must be ignored by the receiving device. APL is asserted and sampled on the rising edge of REFCLK. |
| AV5 | link layer tristate output PHY input | ADD BUS Payload Indicator (AV5). This active low signal locates the position of the floating payload for each tributary within the ADD BUS structure. Multiple link layer devices can drive this signal at uniquely assigned tributary columns within the SBI bus structure. All movements indicated by this signal must be accompanied by appropriate adjustments in the APL signal. In locked TVT mode this signal may be driven but must be ignored by the receiving device. |

-continued

| Pin Name | Direction | Function |
|---|---|---|
| AJUST_REQ | PHY tristate output Link layer input | AV5 is asserted and sampled on the rising edge of REFCLK. ADD BUS Justification Request (AJUST_REQ). This signal is used to speed up, slow down or maintain the link layer device which is sending data to the PHY. This is only used when the PHY layer device is the timing master for the transmit direction. This active high signal indicates negative timing adjustments when asserted high during the V3 or H3 Octet, depending on the tributary type. In response to this the link layer device should send an extra byte in the V3 or H3 octet of the next frame along with valid DPL indicating a negative justification. This signal indicates positive timing adjustments when asserted high during the octet following the V3 or H3 octet, depending on the tributary type. The link layer device should respond to this by not sending an octet during the V3 or H3 octet of the next frame along with valid DPL indicating a positive justification. All timing adjustments from the link layer in response to the justification request must still set the payload and payload indicators appropriately for timing adjustments. In synchronous T1 and E1 modes this signal is unused and must be held high. In locked TVT mode this signal is unused and must be held high. AJUST_REQ is asserted and sampled on the rising edge of REFCLK. |
| AACTIVE | link layer output | ADD BUS Active Indicator (AACTIVE). This active high signal is asserted high during all octets when driving data and control signals, ADATA[7:0], ADP, APL and AV5, onto the bus. All other SBI link layer devices driving the bus listen to this signal to detect multiple sources driving the bus which can occur due to configuration problems AACTIVE is asserted on the rising edge of REFCLK. |
| ADETECT | link layer input | ADD BUS Active Detector (ADETECT). This input listens to the OR of all other SBI Link layer bus masters. A Link layer device will listen to the OR of all other Link layer AACTIVE signals. When a device is driving AACTIVE high and detects ADETECT is high from another device it signals a collision and backs off driving the bus to minimize or eliminate contention. Some SBI devices may provide multiple ADETECT signals which are internally ORed together ADETECT is an asynchronous signal which must be used to disable the tristate drivers on the ADD BUS. The AND of AACTIVE and ADETECT is sampled on the rising edge of REFCLK to indicate that a collision occurred and can be used to indicate contention to management procedures. |

Notes on Pin Description

1. All outputs on the SBI bus are tristate outputs. Output drive is recommended 8 mA to handle capacitive loads up to 100 pF with 10K Ohms connecting to 3.3V.

4.2 ADD BUS Functional Timing

Figure 9:
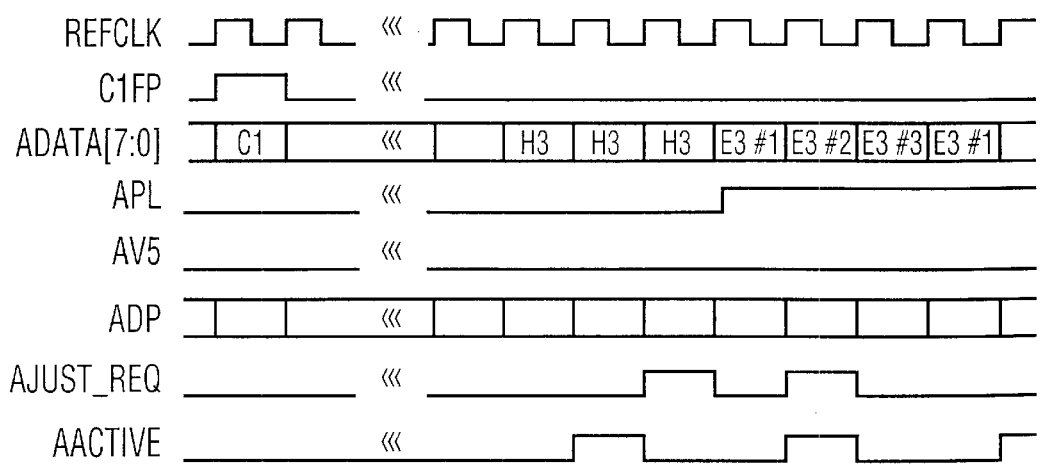
FIG. 9 is a diagram of the functional timing of the adjustment request for the DS3/E3 ADD BUS.

FIG. 9 shows both positive and negative justification requests, which would take effect during the next multi-frame. The negative justification request occurs on the E3#3 tributary when AJUST_REQ is asserted low during the H3 octet. The positive justification occurs on the E3#2 tributary when AJUST_REQ is asserted high during the first E3#2 octet after the H3 octet. The AACTIVE signal indicates an SBI link layer device which is driving E3#2 onto the SBI ADD BUS.

4.3 ADD BUS Interface Timing Characteristics

Figure 10:
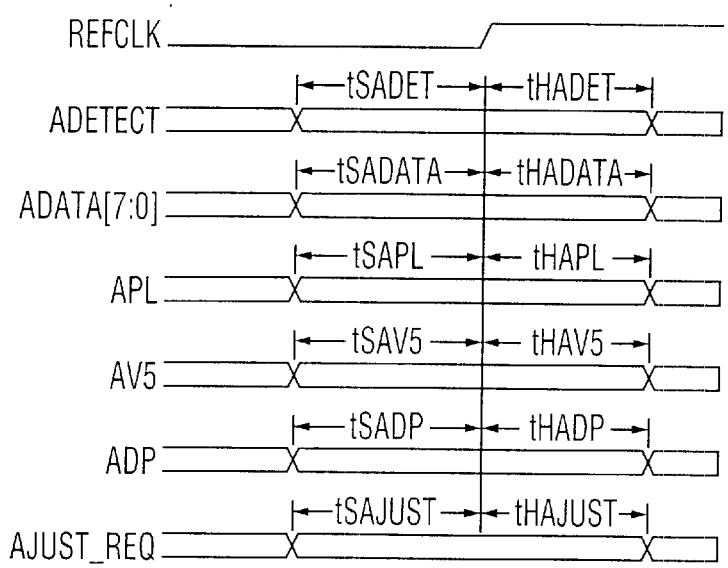
FIG. 10 is a diagram of the ADD BUS input interface timing.
Figure 11:
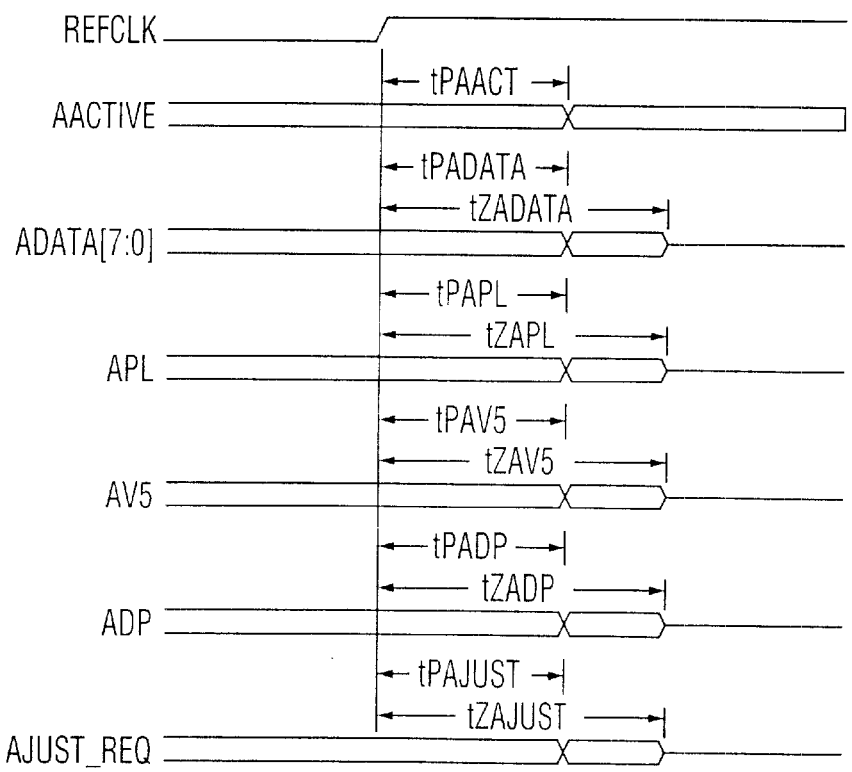
FIG. 11 is a diagram of the ADD BUS output interface timing.
Figure 12:
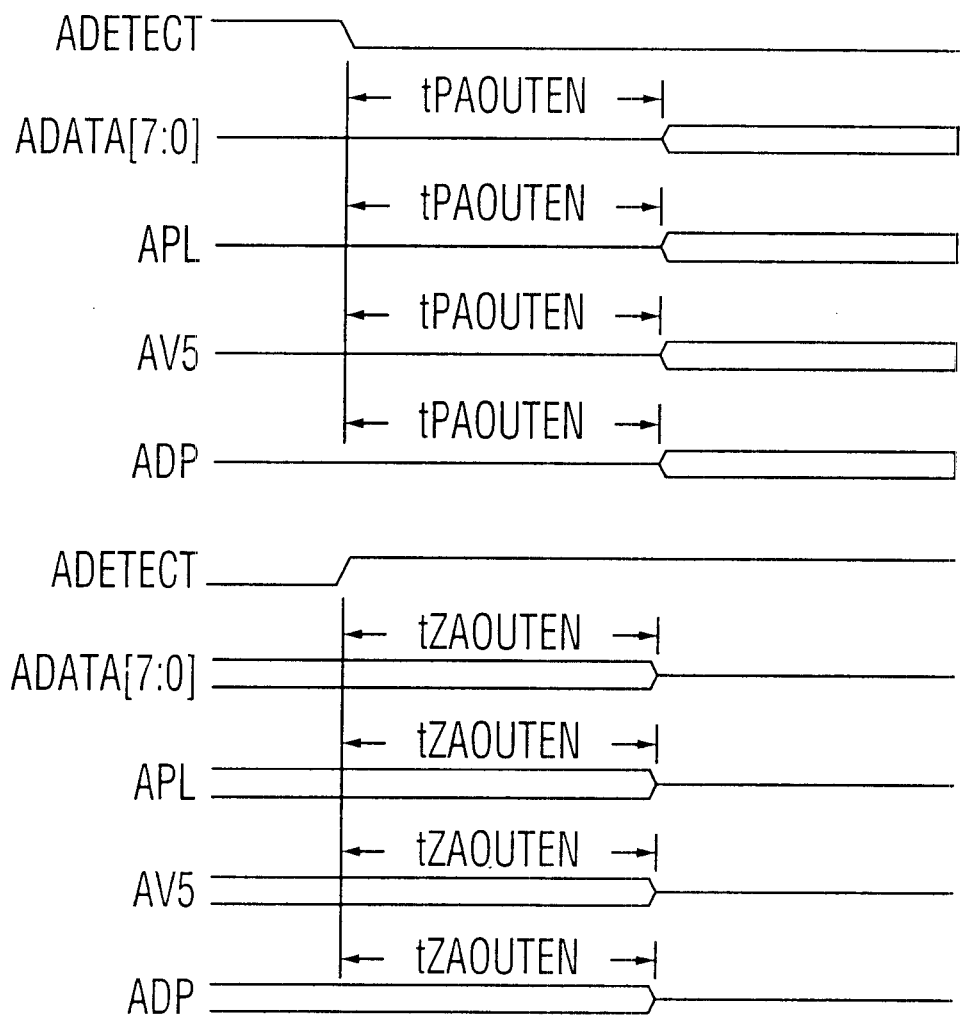
FIG. 12 is a diagram of the ADD BUS asynchronous output interface timing.

The ADD BUS timing is the same as the DROP BUS timing as indicated in tabular form in tables 22, 23 and 24, while the ADD BUS timing diagrams are shown in FIGS. 10, 11, and 12.

TABLE 22

ADD BUS Interface Input Timing -
(TC = −40° C. to + 85° C., VDD = 3.3 V ± 10%)

| Symbol | Parameter | Min | Max | Units |
|---|---|---|---|---|
| tSADET | REFCLK to Valid ADETECT Set-up Time | 20 | | ns |
| tHADET | REFCLK to Valid ADETECT Hold Time | 0 | | ns |
| tSADATA | REFCLK to Valid ADATA Set-up Time | 4 | | ns |
| tHADATA | REFCLK to Valid ADATA Hold Time | 0 | | ns |
| tSAPL | REFCLK to Valid APL Set-up Time | 4 | | ns |
| tHAPL | REFCLK to Valid APL Hold Time | 0 | | ns |
| tSAV5 | REFCLK to Valid AV5 Set-up Time | 4 | | ns |
| tHAV5 | REFCLK to Valid AV5 Hold Time | 0 | | ns |
| tSADP | REFCLK to Valid ADP Set-up Time | 4 | | ns |
| tHADP | REFCLK to Valid ADP Hold Time | 0 | | ns |
| tSAJUST | REFCLK to Valid AJUST_REQ Set-up Time | 4 | | ns |
| tHAJUST | REFCLK to Valid AJUST_REQ Hold Time | 0 | | ns |

TABLE 23

ADD BUS Interface Output Timing

| Symbol | Parameter | Min | Max | Units |
|---|---|---|---|---|
| tPAACT | REFCLK Edge to AACT Prop Delay | | 15 | ns |
| tPADATA | REFCLK Edge to ADATA Prop Delay (consecutive tributary assignment) | | 20 | ns |
| tZADATA | REFCLK Edge to ADATA Output Tri-state (non-consecutive tributary assignment) | | 15 | ns |
| TPAPL | REFCLK Edge to APL Prop Delay (consecutive tributary assignment) | | 20 | ns |
| TZAPL | REFCLK Edge to APL Output Tri-state (non-consecutive tributary assignment) | | 15 | ns |
| tPAV5 | REFCLK Edge to AV5 Prop Delay (consecutive tributary assignment) | | 20 | ns |
| tZAV5 | REFCLK Edge to AV5 Output Tri-state (non-consecutive tributary assignment) | | 15 | ns |
| TPADP | REFCLK Edge to ADP Prop Delay (consecutive tributary assignment) | | 20 | ns |
| TZADP | REFCLK Edge to ADP Output Tri-state (non-consecutive tributary assignment) | | 15 | ns |
| tPAJUST | REFCLK Edge to AJUST_REQ Prop Delay (consecutive tributary assignment) | | 20 | ns |
| tZAJUST | REFCLK Edge to AJUST_REQ Output Tri-state (non-consecutive tributary assignment) | | 15 | ns |

TABLE 24

ADD BUS Asynchronous Output Interface Timing

| Symbol | Parameter | Min | Max | Units |
|---|---|---|---|---|
| tPAQUTEN | Asynchronous ADETECT Low to ADATA[7:0], APL, AV5, ADP Prop Delay | | 12 | ns |
| tZAQUTEN | Asynchronous ADETECT High to ADATA[7:0], APL, AV5, ADP High Impedance | | 12 | ns |

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments as fall within the true scope of the invention.

What is claimed is:

1. A scaleable bandwidth interconnect (SBI) for interconnection of physical layer devices with link layer devices, comprising:

(a) a unidirectional ADD BUS interface operative to receive data from one or more of said link layer devices and direct it to one or more of said physical layer devices wherein for each link on said ADD BUS interface timing is derived from a corresponding one of said link layer devices or said physical layer devices; and (b) a unidirectional DROP BUS interface operative to receive data from one or more of said physical layer devices and direct it to one or more of said link layer devices wherein for each link on said DROP BUS interface timing is derived from a corresponding one of said physical layer devices.

2. The interconnect according to claim 1, wherein data structures of the SBI are floating.

3. The interconnect according to claim 2, wherein said SBI has payload indicator signals to control position and timing of the floating data structures.

4. The interconnect according to claim 1, wherein said DROP BUS is operative to transfer timing from one of said physical layer devices.

5. The interconnect according to claim 1, wherein said ADD BUS is operative to transfer timing from one of said link layer devices and said physical layer devices.

6. The interconnect according to claim 5, wherein timing information is obtained by one of said physical layer devices from an arrival rate of data across said SBI when one of said link layer devices is timing master.

7. The interconnect according to claim 5, wherein a justification request signal is sent by one of said PHY devices which is timing master to one of said link layer devices to signal said link layer device to speed up or slow down.

8. The interconnect according to claim 1, wherein data structures of the SBI are operative to transfer ABCD signaling bits across said SBI.

9. The interconnect according to claim 1, wherein data structures of the SBI are operative to transfer alarm indications across said SBI.

10. The interconnect according to claim 1, wherein data structures of the SBI are operative to transfer 8 KHz timing across said SBI.

11. The interconnect according to claim 1, wherein data structures of the SBI are operative to transfer per link clock reconstruction information across said SBI.

12. The interconnect according to claim 1, wherein links in the form of T1, E1, DS3, and E3 signals are multiplexed onto and demultiplexed from the SBI bus.

13. The interconnect according to claim 1, wherein said interconnect has a time division multiplexed bus which has a SONET/SDH virtual tributary structure to carry T1 links, E1 links and TVTs.

14. The interconnect according to claim 1, wherein said interconnect has a fixed frequency as determined by a reference clock REFCLK and alignment as determined by a frame indicator signal C1FP.

15. The interconnect according to claim 14, wherein the location of T1/E1/DS3/E3/TVT1.5/TVT2 links is adjusted using floating tributaries to compensate for frequency deviations.

16. The interconnect according to claim 1, wherein each frame has three synchronous payload envelopes with each envelope carrying one of T1, E1, TVT1.5, TVT2, DS3 and E3 tributaries in an SDH STM-1 like format.

17. The interconnect according to claim 1, wherein each frame has three synchronous payload envelopes with each envelope carrying one of 28 T1s, 21 E1s, 28 TVT1.5s, 21 TVT2s, a DS3 or an E3.

18. The interconnect according to claim 17, wherein said SBI permits switching of links among said physical layer devices and said link layer devices whereby a link may be switched from one physical layer device to a link layer device.

19. The interconnect according to claim 1, wherein said link layer devices have high density physical layer framers.

20. The interconnect according to claim 1, wherein said SBI is scaleable by increasing the bus clock rate in multiples of 2.

21. The interconnect according to claim 1, wherein said SBI is scaleable by increasing the bus width in multiples of two.

* * * * *

UNITED STATES PATENT AND TRADEMARK OFFICE
CERTIFICATE OF CORRECTION

PATENT NO. : 6,584,521 B1
DATED : June 24, 2003
INVENTOR(S) : Dillabough et al.

It is certified that error appears in the above-identified patent and that said Letters Patent is hereby corrected as shown below:

Column 7,
Table 5, in the last row of numbers, delete " 2 "; delete the first occurrence of "3", and replace it with -- 2 --; and in the space after the second occurrence of "3", insert -- 3 --.

Column 8,
Line 67, delete "octed", and insert -- octet --.

Column 13,
Line 26, delete "ing", and insert -- signaling --.

Column 14,
Line 27, after "SPE1 ", insert -- . --.
Line 37, after "after", insert -- the --.
Table 12, add shading and borders as per attached appendix.

Column 16,
Table 15, add shading and borders as per attached appendix.

Column 18,
Table 17, in Row #1, delete "VS", and insert -- V5 --.
Table 17, add shading as per attached appendix.

Column 20,
Table 18, add shading as per attached appendix.

Column 23,
In the continuation of Table 18, under the heading "Function", insert -- , -- between "DDP" and "DPL".

Column 24,
Table 19, in the heading in parentheses, delete "-40° C. to +85° C.", and insert -- 40° C to + ... 85° C --.

UNITED STATES PATENT AND TRADEMARK OFFICE
CERTIFICATE OF CORRECTION

PATENT NO. : 6,584,521 B1
DATED : June 24, 2003
INVENTOR(S) : Dillabough et al.

It is certified that error appears in the above-identified patent and that said Letters Patent is hereby corrected as shown below:

Column 28,
Table 22, in the heading in parentheses, delete "-40° C. to +85º C.", and insert
-- 40° C to + 85° C --.

Column 29,
Table 24, under the heading "Symbol", delete "tPAQUTEN", and insert
-- tPAOUTEN --.
Table 24, under the heading "Symbol", delete "tZAQUTEN", and insert
-- tZAOUTEN --.

Signed and Sealed this

Thirteenth Day of April, 2004

JON W. DUDAS
*Acting Director of the United States Patent and Trademark Office*